(12) United States Patent
Gleason et al.

(10) Patent No.: US 6,349,161 B1
(45) Date of Patent: Feb. 19, 2002

(54) UNDERSEA COMMUNICATIONS CABLE HAVING CENTRALLY LOCATED, PLASTIC BUFFER TUBE

(75) Inventors: Robert F. Gleason, Freehold, NJ (US); Craig E. Murphy, Dover, NH (US); Seymour Shapiro, Brooklyn, NY (US); William F. Wright, York, ME (US); Chung-Shin Ma, Morganville, NJ (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/378,081

(22) Filed: May 28, 1999

(51) Int. Cl.$^7$ .................................................. G02B 6/44
(52) U.S. Cl. ........................................................ 385/113
(58) Field of Search ................................. 385/100–117

(56) References Cited

U.S. PATENT DOCUMENTS

| | | | |
|---|---|---|---|
| 4,156,104 A | 5/1979 | Mondello ................ 174/70 R |
| 4,278,883 A | 7/1981 | Hathaway et al. ..... 250/277 CH |
| 4,370,023 A | 1/1983 | Lange et al. ............ 350/96.23 |
| 4,420,220 A | 12/1983 | Dean et al. .............. 350/96.23 |
| 4,538,881 A | 9/1985 | Anctil et al. ............. 350/96.23 |
| 4,645,298 A | 2/1987 | Gartside, III ............ 350/96.23 |
| 4,693,551 A | 9/1987 | Blanco et al. ........... 350/96.23 |
| 4,765,711 A | 8/1988 | Obst ....................... 350/96.23 |
| 4,767,182 A | 8/1988 | Parfree et al. ........... 350/96.23 |
| 4,786,137 A | 11/1988 | Cornelison et al. ...... 350/96.23 |
| 4,913,516 A | 4/1990 | Ikeda ....................... 350/96.23 |
| 4,960,318 A | 10/1990 | Nilsson et al. ........... 350/96.23 |
| 5,015,063 A | * 5/1991 | Pansuka et al. .............. 385/113 |
| 5,029,974 A | 7/1991 | Nilsson .................... 350/96.23 |
| 5,050,957 A | * 9/1991 | Hamilton et al. ............ 385/113 |
| 5,121,458 A | 6/1992 | Nilsson et al. ............... 385/100 |
| 5,125,062 A | 6/1992 | Marlier et al. .............. 385/101 |
| 5,125,063 A | * 6/1992 | Pansuka et al. .............. 385/113 |
| 5,165,003 A | * 11/1992 | Carter ........................ 385/112 |
| 5,199,096 A | * 3/1993 | Kathiresan et al. ......... 385/109 |
| 5,212,756 A | 5/1993 | Eoll ............................ 385/114 |
| 5,268,971 A | 12/1993 | Nilsson et al. ............... 385/101 |
| RE34,516 E | 1/1994 | Houghton .................... 385/103 |
| 5,329,606 A | 7/1994 | Andreassen ................. 385/109 |
| 5,334,421 A | 8/1994 | McNutt ....................... 427/513 |
| 5,384,880 A | 1/1995 | Keller et al. ................. 385/109 |
| 5,505,773 A | 4/1996 | Vitands et al. .............. 106/272 |
| 5,561,729 A | 10/1996 | Parris ......................... 385/113 |
| 5,574,816 A | 11/1996 | Yang et al. .................. 385/109 |
| 5,577,150 A | 11/1996 | Holder et al. ................ 385/134 |
| 5,619,606 A | 4/1997 | Bonicel ....................... 385/102 |
| 5,621,031 A | 4/1997 | Leimann et al. ............. 524/195 |
| 5,751,880 A | 5/1998 | Gaillard ...................... 385/109 |
| 5,761,362 A | 6/1998 | Yang et al. .................. 385/109 |
| 6,041,153 A | * 3/2000 | Yang .......................... 385/109 |
| 6,088,499 A | 7/2000 | Newton et al. .............. 385/112 |

* cited by examiner

*Primary Examiner*—Akm E. Ullah

(57) ABSTRACT

An optical fiber cable is provided for undersea applications that include a hollow buffers tube with at least one optical fiber disposed therein. The buffer tube is formed from a plastic material. A water-blockable gel is located in the buffer tube and a series of strength members are configured in a close-packed arrangement around the buffer tube. A metal conductor surrounds the series of strength members and a plastic jacket encapsulating the metal conductor.

6 Claims, 2 Drawing Sheets

UNDERSEA COMMUNICATIONS CABLE HAVING CENTRALLY LOCATED, PLASTIC BUFFER TUBE

FIELD OF THE INVENTION

The present invention relates generally to undersea optical fiber communications cables, and more particularly to an optical fiber communications cable that employs centrally located buffer tube.

BACKGROUND OF THE INVENTION

Communication systems employing optical fibers as the transmission medium have become widespread because of their wide bandwidth, relatively low optical loss, and the development of optical amplifiers that do not require conversion of the optical signal into the electrical domain for amplification. Because of the fragile nature of glass optical fibers, which may have diameters as small as 250 microns, the fibers must be physically protected from external forces by a cable.

The construction requirements of the cable will differ depending on the particular application for which the optical cable is to be used. A number of different cable designs are currently in use. For example, in a loose tube structure several gel filled buffer tubes containing optical fibers are stranded around a central strength member. In a monotube structure all of the optical fibers are disposed in a single centrally located gel filled buffer tube. The different cable structures all incorporate additional protection, which may include support members, power connectors, corrugated armor and plastic sheaths.

An essential component of the optical cable is the support members, which support most of the tension that is applied to the cable during its installation and subsequent operation. The support members may be arranged in a number of configurations. For example, two strength members may be employed, which are embedded in an outer jacket and located 180 degrees apart from one another. Other configurations employ a concentric series of support members uniformly distributed over 360 degrees. These configurations are often employed in terrestrial applications.

In designing a cable for undersea use, it is necessary to overcome a number of environmental factors such as low temperature, high compressive pressure and the corrosive effects of seawater. Additionally, undersea cables must withstand large tensile and bending stresses encountered during cable laying and recovery operations. Accordingly, undersea applications typically require additional strength members in comparison to terrestrial cables. For these applications one or more layers of support members are disposed in a close packed arrangement surrounding the buffer tube.

In the loose tube and monotube designs, the buffer tube is the primary structure protecting the optical fibers. Accordingly, the buffer tube should be made from a material having a high Young's modulus. The use of a material with a high Young's modulus results in a cable with a buffer tube having relatively high tensile and compressive resistance capability, characteristics that are useful in protecting the optical fibers in the event the cable is twisted, stretched or compressed. It is also important to select a material for the buffer tube that has a low thermal expansion coefficient. Too much shrinkage or expansion of the buffer tube caused by temperature changes could place tensile or compressive loads on the optical fibers, resulting in damaged or broken optical fibers.

To meet these stringent requirements, monotube structures designed for terrestrial applications have been made from a plastic material such as polybutylene terephthalate (PBT), polycarbonate, or a polyamide such as Nylon. However, undersea applications have often employed metallic buffer tubes fabricated from materials such as stainless steel or aluminum. Metal has been the preferred material because of its strength and because it serves as a barrier to the diffusion of hydrogen through the buffer tube, where it interacts with the optical fibers, adversely impacting their optical quality. Specifically, hydrogen increases the optical attenuation of the fibers.

Unfortunately, metal buffer tubes are more expensive than plastic buffer tubes and increase the complexity of manufacturing the resulting cable because the buffer tubes must be sealed with a laser weld.

SUMMARY OF THE INVENTION

In accordance with the present invention, an optical fiber cable is provided for undersea applications that include a hollow buffer tube with at least one optical fiber disposed therein. The buffer tube is formed from a plastic material. A water-blockable gel is located in the buffer tube and a series of strength members are configured in a close-packed arrangement around the buffer tube. A metal conductor surrounds the series of strength members and a plastic jacket encapsulating the metal conductor.

Because a plastic buffer tube is employed instead of a metallic buffer tube, the present invention significantly reduces both the material cost and the complexity of manufacture of the resulting cable.

DETAILED DESCRIPTION

Figure 1:
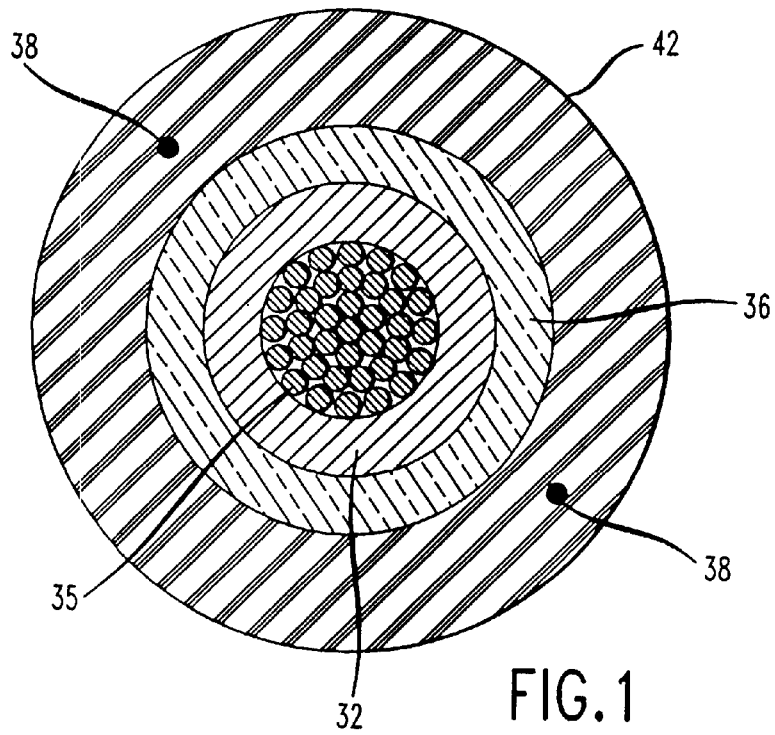
FIGS. 1 and 2 shows cross-sectional views of a prior art optical fiber cable.

FIG. 1 shows a prior art cable of a type often used in terrestrial applications. The cable includes a single, large gel-filled buffer tube 32 made from PBT. The gel in the buffer tube 32 is a thixotropic, water-blockable gel. The gel-filled buffer tube 32 contains a plurality of optical fibers 35. A corrugated steel armor 36 surrounds the buffer tube 32. Optionally, radial strength yarns (not shown) made from a material such as aramid or polyethylene, may be located between the buffer tube 32 and steel armor 36. The radial strength yarns are typically contra-helically stranded around the buffer tube 32. An outer jacket 42 formed from polyethylene encapsulates the armor or radial strength yarns. Two strength members 38 are located 180 degrees apart and are embedded in the outer jacket 42.

Figure 2:
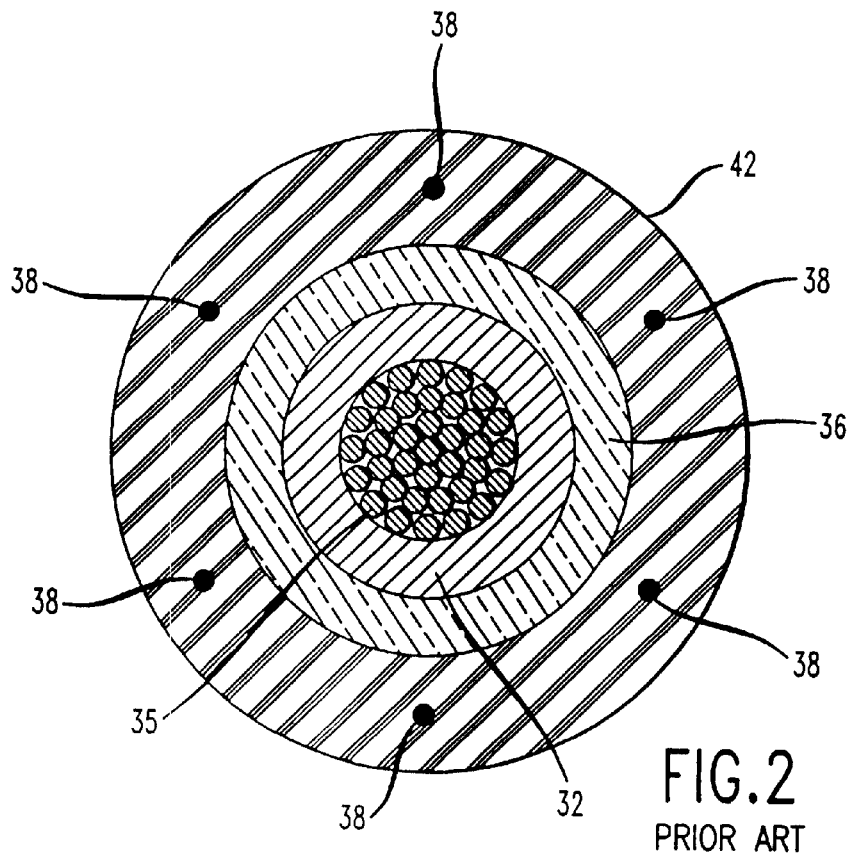

FIG. 2 shows another prior art cable similar to the cable shown in FIG. 1, which employs additional strength members. In FIGS. 1 and 2 like elements are denoted by like reference numerals. The cable of FIG. 2 is also typically employed in terrestrial applications.

Figure 3:
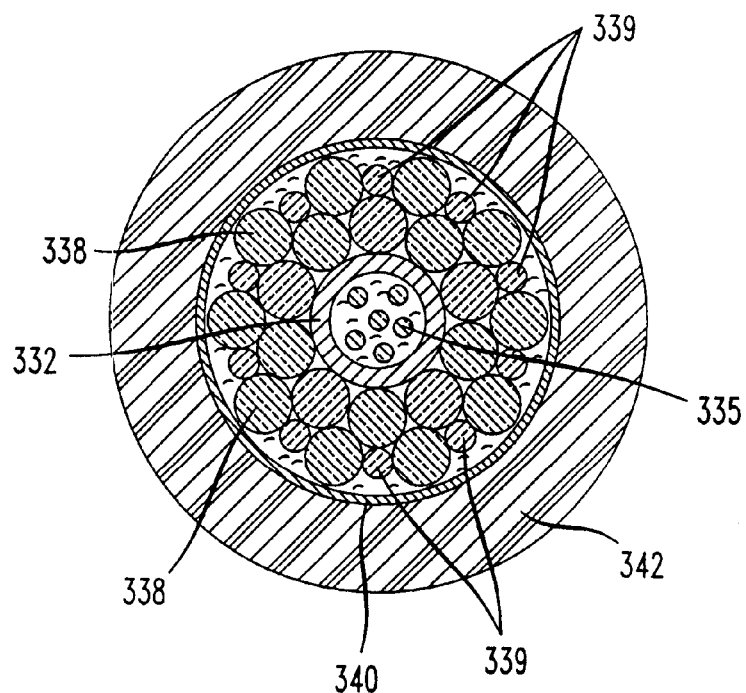
FIG. 3 shows a cross-sectional view of a prior art optical fiber cable employed in undersea applications.

FIG. 3 shows a prior art cable typically employed in undersea applications. This cable differs from the previously described cables primarily in its use of a metallic buffer tube and additional strength members. Specifically, optical cable 330 comprises a single, centrally located gel-filled buffer tube 332 made from a metal such as aluminum or stainless steel. The gel in the buffer tube 332 is a thixotropic, water-blockable gel. The gel-filled buffer tube 332 contains a plurality of optical fibers 335. Two layers of strength members are wound around the buffer tube. One layer includes strength members 338 and the other layer includes strength members 339. The strength members have a circular cross-section. Each layer of strength members is arranged in a close-packed configuration. That is, the inner layer comprises eight strength members in which adjacent members are in contact with one another. Similarly, the outer layer comprises 16 strength members in which adjacent members are in contact with one another. A copper conductor 340 surrounds the strength members and serves as both an electrical conductor and a hermetic barrier. An outer jacket 342 formed from polyethylene encapsulates the copper conductor and serves as an insulating layer.

The tensile loads that the previously-described cables can withstand differ dramatically between the terrestrial cables of FIGS. 1 and 2 and the undersea cable of FIG. 3. For example, terrestrial cables can typically withstand a tensile load of only 600 lbs. whereas an undersea cable can typically withstand a tensile load of 20,000 lbs. This difference is primarily due to the different arrangement of the strength members used in the terrestrial and undersea cables. Specifically, the high tensile strength of the undersea cable arises from the use of a double layer winding of close-packed strength members.

Figure 4:
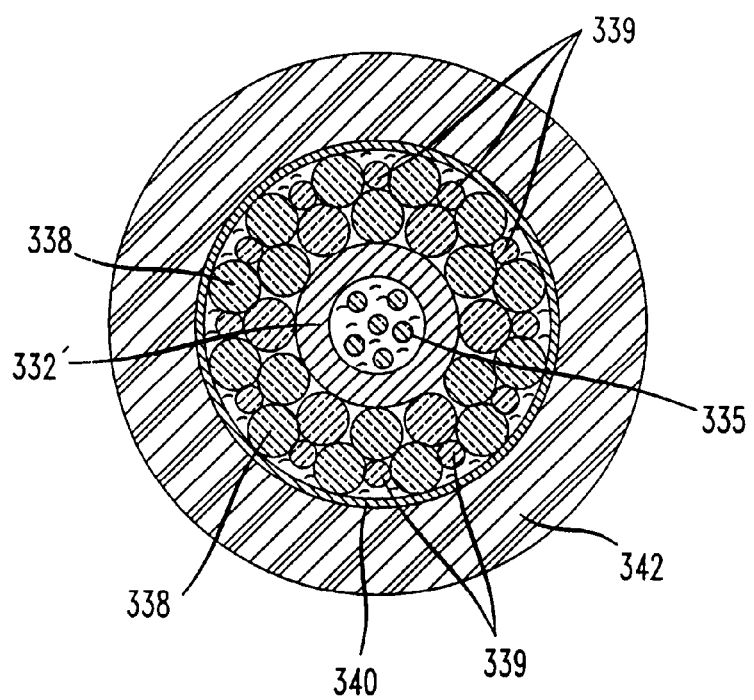
FIG. 4 shows a cross-sectional view of an optical fiber cable constructed in accordance with the present invention.

The inventors have surprisingly determined that a buffer tube fabricated from a plastic material can be used in an undersea cable having strength members with a closepacked configuration such as shown in FIG. 3. By avoiding the use of a metallic buffer tube the present invention significantly reduces both the material cost and the complexity of manufacture. FIG. 4 shows one embodiment of the inventive cable. In FIGS. 3 and 4, like elements are denoted by like reference numbers. In the inventive cable of FIG. 4, centrally located buffer tube 332' is formed from a plastic material such as polybutylene terephthalate (PBT), for example. In contrast, buffer tube 332 shown in FIG. 3 is formed from a metallic material.

The present invention advantageously provides a fiber optical cable that has sufficient tensile and compressive strength for use in undersea applications while also providing a buffer tube that adequately protects the optical fibers in an undersea environment. Moreover, the inventive cable is less expensive and simpler to manufacture than cables previously employed in undersea environments.

What is claimed is:

1. An optical fiber cable, comprising:
   a hollow buffer tube with at least one optical fiber disposed therein, said buffer tube being formed from a plastic material;
   a water-blockable gel located in the buffer tube;
   a series of strength members configured in a close-packed arrangement around the buffer tube;
   a metal conductor surrounding the series of strength members; and
   a plastic jacket encapsulating the metal conductor.

2. The cable of claim 1 wherein the buffer tube is formed from polybutylene terephthalate.

3. The cable of claim 1 wherein the buffer tube is formed from polycarbonate.

4. The cable of claim 1 wherein said strength members are arranged in at least two layers in contact with one another.

5. The cable of claim 4 wherein an inner layer of said two layers includes eight strength members.

6. The cable of claim 1 wherein said plastic jacket is formed from polyethylene.

* * * * *

UNITED STATES PATENT AND TRADEMARK OFFICE
CERTIFICATE OF CORRECTION

PATENT NO. : 6,349,161 B1
DATED : February 19, 2002
INVENTOR(S) : Robert F. Gleason et al.

It is certified that error appears in the above-identified patent and that said Letters Patent is hereby corrected as shown below:

Drawings,
Sheet 2, Figs. 3 and 4, insert the following corrections: the reference numeral 330 should be applied to the optical cable;

reference numeral 338 should be applied to the inner strength members of the buffer tube; and reference numeral 339 should be applied to the outer strength members of the the buffer tube.

Signed and Sealed this

Second Day of July, 2002

Attest:

JAMES E. ROGAN
Attesting Officer          Director of the United States Patent and Trademark Office